2,987,459
GAS COOLED NUCLEAR REACTORS
Jacques Labeyrie, Paris, and André Roguin, Bourg-la-Reine, France, assignors to Commissariat a l'Energie Atomique, Paris, France, a body corporate
Filed May 29, 1956, Ser. No. 588,100
Claims priority, application France June 9, 1955
3 Claims. (Cl. 204—193.2)

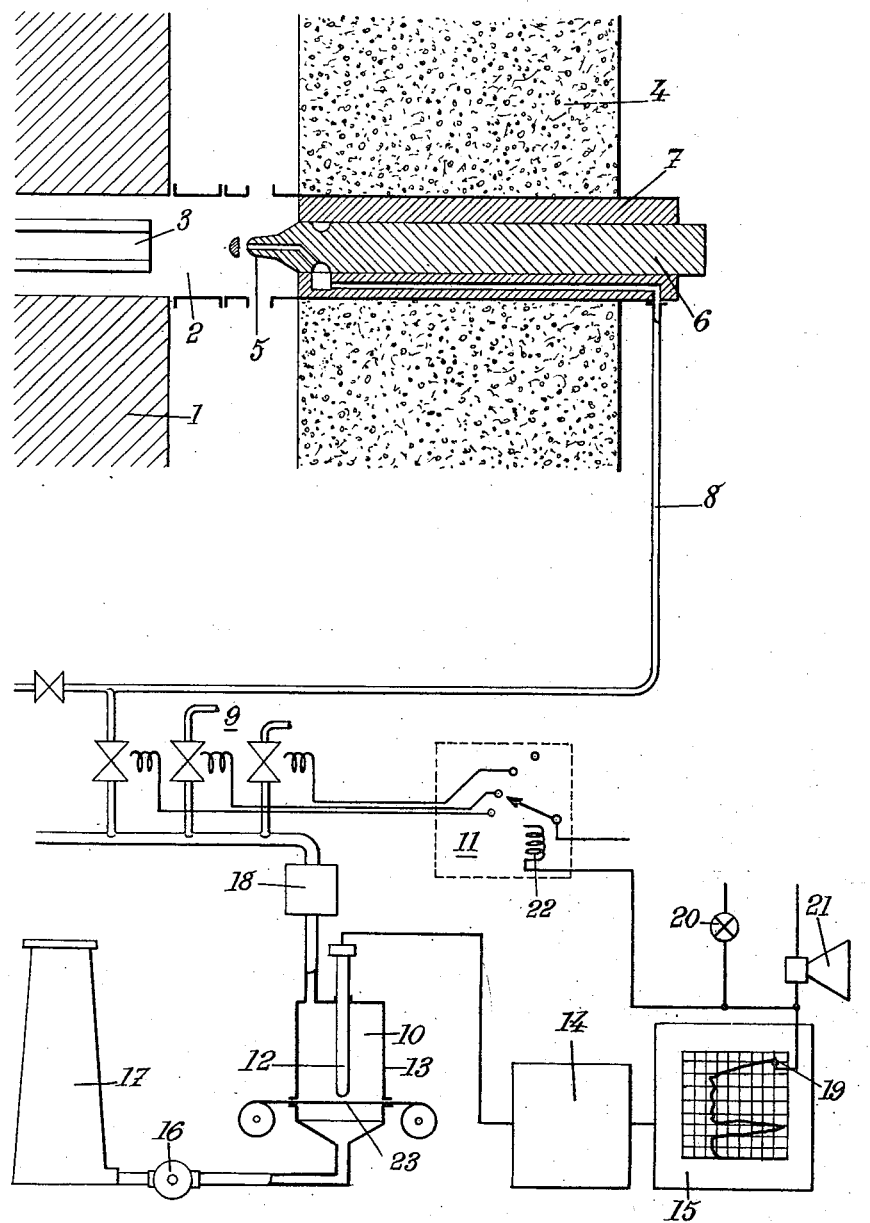

The present invention relates to gas cooled nuclear reactors. In such reactors, the fissionable material is in the form of lumps, for instance of cylindrical shape, contained in gas-tight casings. The whole of a lump of fissionable material and of the casing that surrounds it is sometimes called a slug. The slugs of a nuclear reactor form a plurality of groups, each group including one or several slugs. Said slugs are located in channels through which the coolant gas is circulated.

When, in a group of slugs, at least one casing is no longer gas tight, highly radio-active residues will soil the coolant gas stream downstream of said group. On the other hand, some amount of coolant gas enters the defective casing, where it may react on the fissionable material and cause it to swell so that it becomes difficult to remove the lump of fissionable material from the casing.

Furthermore, whereas some leaks remain small and therefore relatively little dangerous for practical purposes, other leaks may develop constantly.

The object of the present invention is to provide a gas cooled nuclear reactor in which leaking casings are quickly detected and the evolution of the leaks can be watched during the operation of the reactor.

For this purpose, according to our invention, leaks in the above mentioned casings are found out by detecting the resulting variations of radio-activity of coolant gas streams having flown along said casings, means being provided for successively testing gas streams that have flown along the respective groups of casings, account being taken of the radio-activity normally communicated to the streams of coolant gas as a consequence of their passage through the reactor.

A leak in the casing which surrounds a lump of fissionable material causes the outflow, into the stream of coolant gas flowing along said casing, of fission atoms. These fission atoms belong to highly radio-active solid or gaseous elements which give birth to a chain of products which are also radio-active. These radio-active products, which have escaped through the leak, may or may not be electrically charged.

The variation of radio-activity due to the presence of these radio-active products in the coolant gas may be detected in the total gaseous stream escaping from the reactor. A detecting apparatus, such as a ionization chamber, a Geiger counter, a proportional counter, a scintillation counter, or the like, is capable of detecting, in the total gas stream flowing out from the nuclear reactor, the presence of a radio-activity higher than normal.

A higher sensitivity is obtained by detecting, in every gas stream corresponding to an individual slug, the radio-activity existing in said gas stream, whereby there must be provided a detecting device at the output of every channel of the reactor.

When the coolant gas flows in a closed circuit and if the respective gaseous streams coming from the different channels are mixed together, the device must have a very short time of response as compared with the total time of circulation of the gas. This time of response is that of the detector apparatus itself or it results from the utilization of fission products of short period.

When cooling is obtained by means of a gas which is discharged, it is easy to collect the gas from every channel before said gas reaches the main conduit where all the individual gas streams are mixed together. The gas stream thus collected, which may contain fission atoms, arrives through suitable tubes, in the vicinity of a suitable detector such as above mentioned, which, in this case, may be located at a great distance from the reactor. Such an arrangement increases safety and permits of more easily reaching the detector apparatus.

According to our invention, in order to obtain a good supervision of the reactor by means of a number of detector devices much lower than the number of slugs of the reactor, we provide means for successively connecting with one detector apparatus, a plurality of gaseous streams having flown along different groups of slugs respectively (it being well understood that a group of slugs may consist of a single slug). Thus, every group of slugs is intermittently tested concerning its radio-activity. Of course, this intermittent supervision may be completed by a permanent supervision of a plurality of groups and even of the whole of the groups of slugs of the reactor. A great number of different combinations for supervision may be obtained by means of suitable automatic switches.

According to our invention we may use, to detect leaks and to determine their importance, atoms or molecules of solid elements either in the free state or fixed on a material support such as a filter (as it will be more explicitly explained hereinafter). We may also make use of the atoms or molecules of gaseous elements. We may also combine the use of solid and gaseous products simultaneously.

When use is made of the solid radio-active elements contained in the coolant gas, a very good sensitivity of the device is obtained, according to our invention, by concentrating these elements onto a suitable filter, for instance made of various fibres, of electrostatic fibres utilizing the possible charge of these atoms, etc.

The accumulation of the solid radio-active elements on this filter amplifies the effect exerted by said elements on the detector apparatus. Such an amplification is particularly advantageous when the coolant gas is given a high normal radio-activity as a result of its passage through the reactor, which would tend to minimize the effect of a signal due to a leakage of fission products into said gas.

The filter, which may be in the form of a continuous band passing through the detection chamber, may be given a continuous or discontinuous movement, in order to separate the effects due to different channels.

We may also use the chemical reactions of these elements. For instance we may chemically separate from the coolant gas some bodies or some series of isotopes of the same body (for instance the 85, 87 and 88 isotopes of bromine, the 129, 131 and 132 isotopes of iodine, those of cerium, of strontium, etc.), these bodies coming, either directly or not, from fission of the fissionable material that is to be supervised, these bodies being subsequently subjected to detection.

Such an operation is relatively little sensitive, but it is very much selective since the radio-activity it permits of detecting is necessarily due to the fissions that are to be detected.

When use is made of gaseous radio-active elements contained in the coolant gas, these gaseous elements may be retained in active carbon or any other adsorbing product.

We may also, according to the invention, immerse the detector apparatus in a given volume of coolant gas to be analyzed. Owing to this analyzing chamber, the detector measures the radiation emitted by the gaseous or solid elements which disintegrate as they are passing through the chamber. All kinds of radiation measuring apparatus may be used, for instance an ionization chamber with gas circulation or a closed chamber, a Geiger or proportional counter, a scintillation counter, etc.

This last mentioned feature is one of those which give the best possible sensitivity of detection, in particular in the case of reactors cooled by means of air which passes only once through the apparatus.

The detector may, according to a preferred embodiment of our invention, be chosen such that it has, on the one hand, a high sensitivity to radiations of the fission products existing in the coolant gas or to some of these radiations, and, on the other hand, a very low sensitivity to parasitic radiations due to the proximity of the reactor and to the normal activation of the coolant gas (or of bodies, dust, and so on driven off therealong) in the reactor.

This contrast, characterized by the ratio of the signal to the background noise, may be increased for instance, in the case of a counter, by suitably choosing the nature of the filling mixture, the operating voltage, the nature of the wall, the dimensions, etc. In the case of a scintillation apparatus, it may be increased for instance by the nature of the scintillator body, by suitably selecting the amplitude of the impulses that are supplied, etc.

Advantageously, means are provided so that when the detector apparatus indicates a high radio-activity corresponding to a leak in one casing, the channel in which said casing is located is signalled.

Measurement of the intensity of radio-activity of the fission products present in the coolant gas permits of measuring the importance of the leak in one casing.

A preferred embodiment of our invention will be hereinafter described with reference to the accompanying drawing, given merely by way of example, and in which:

The figure is a diagrammatical view of a portion of a nuclear reactor provided with detecting means according to our invention.

It is supposed that the reactor makes use, as fissionable material, of natural uranium and that the moderator is graphite. The reactor is air cooled. Of course, the invention could be applied as well to a reactor cooled by another gas.

The reactor includes a graphite block 1 in which are provided channels for passage of the cooling air, only one of which, to wit 2, is visible on the drawing. 3 represents a gas-tight casing in which is enclosed a uranium cylinder, this casing being placed in a channel 2. The graphite block 1 is surrounded by a concrete wall 4.

At the outlet end of each channel 2, a collecting element 5 catches a portion of the coolant air. This air is conveyed through a plug 6 and a valve device 7 to the outside of the reactor. A tube 8 leads it toward the detector apparatus.

A plurality of electrically operated valves 9 each connected to one pipe such as 8, successively supply to the detector apparatus 10 the air streams coming from the respective channels. Supposing, for instance, that the reactor includes one hundred and thirty-five channels, the period for testing every channel is twenty seconds, which corresponds to a time interval of forty-five minutes between two successive tests in the same channel. This interval is favorable and sufficient to permit of detecting a leak before it may become dangerous. The electrically operated valves 9 are controlled by a switch 11.

The detector apparatus used in this example is a radiation counter 12, sensitive to the beta rays of the fission products and little sensitive to the beta rays of argon 41 (which is due to the activation of argon 40 contained in the coolant air and corresponds to most of the natural radio-activity acquired by said air when flowing through the reactor) and to gamma rays. The discrimination effect is merely obtained by a suitable choice of the thickness of the wall of the counter. This counter is enclosed in a box 13 to which is fed the gas coming from channel 2. It measures the radiation of the gaseous mass contained in said box. Through this box 13 may extend, as shown in the drawing, a band or strip 23 capable of filtering the radio-active elements, this strip being advantageously mounted in such manner that it moves forward a distance equal to the width of box 13 every time the position of switch 11 changes, whereby it is possible to use a fresh filter portion for every channel being tested. An electronic device 14, analogous to known integrators, amplifies the impulses of the counter and transforms them into electric voltages which are recorded in a continuous recording apparatus 15. An air pump 16 ensures air circulation through the collecting pipes and discharges it through stack 17. The volumes supplied through every pipe at the time of detection may, for instance, average one liter per second. A filter 18, upstream of detector apparatus 10, prevents soiling of this detector by dust.

This device works as follows:

As long as the radio-activity of the coolant air remains below a given limit, corresponding to the maximum of the normal radio-activity of said air, switch 11 rotates at a constant speed and the electrically controlled valves 9 are successively opened, whereby the radio-activity in every channel of the reactor is successively measured.

If, at a given time, in one of the channels, the radio-activity of the coolant air rises above said predetermined limit value, a contact 19 of the recording apparatus 15 stops switch 11, for instance by energizing an electromagnet 22, and operates two indicators, one of them being a sound indicator 21 which gives a signal that the switch is stopped and the other being a luminous indicator 20 which indicates the channel where there is a leak.

A device analogous to that above described, and not shown on the drawing, then permits of collecting coolant air in continuous fashion from this channel, and of watching the evolution of the leak, whereas the device above described is again started to test the other channels.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. Device for detecting leaks in the gas-tight jackets surrounding slugs of fissile material generating by neutron bombardment thereof beta-emissive fission products and heat in a heterogeneous nuclear reactor, said heat being carried away by at least one plurality of gas flows circulating through said reactor in heat-exchange relationship with said slugs, comprising, for said plurality, a series of separate duct means for picking up a representative sample of each gas flow in said plurality, common duct means, switching means for successively and recurrently connecting each of said separate duct means with said common duct means, thereby cyclically sending in said common duct means representative samples of each one of said gas flows in said plurality, an enlarged detection chamber, filter means disposed between said common duct means and said detection chamber, means for circulating through said filter means and said detection chamber said representative samples from said common duct means, radiation detector means for detecting the radiation activity in said detection chamber, said radiation detector means being selectively sensitive to the beta rays emitted by said fission products and therefore to the fission products content in said common duct means, and recording means for inscribing the successive determinations of said radiation detector means, thereby recording sequentially and cyclically the fission products content of each of said gas flows in said plurality.

2. Device for detecting leaks in the gas-tight jackets surrounding slugs of fissile material generating by neutron bombardment thereof beta-emissive fission products and heat in a heterogeneous nuclear reactor, said heat being carried away by at least one plurality of gas flows circulating through said reactor in heat-exchange relationship with said slugs, comprising, for each said plurality, a series of separate duct means for picking up a representative sample of each gas flow in said plurality, common duct means, switching means for successively connecting each of said separate duct means with said common duct means, thereby cyclically sending in said common duct means representative samples of each one of said gas flows in said plurality, a filter unit, an enlarged detection chamber, means for circulating successively through said filter unit and said detection chamber said representative samples from said common duct means, a fission products collecting element disposed in said detection chamber, a radiation detector disposed in said detection chamber in the vicinity of said collecting element, said radiation detector being selectively sensitive to the beta rays emitted by said fission products, and therefore to the fission products content in said collecting element, and recording means for inscribing the successive determinations of said radiation detector, thereby recording cyclically the fission products content of each one of said gas flows in said plurality.

3. Device for detecting leaks as claimed in claim 2, wherein said fission products collecting element is constituted by a fibrous filtering strip and further comprising means for intermittently advancing said filtering strip through said detection chamber.

References Cited in the file of this patent
UNITED STATES PATENTS

| | | |
|---|---|---|
| 2,694,335 | Albright et al. | Nov. 16, 1954 |
| 2,741,592 | Borst et al. | Apr. 10, 1956 |
| 2,777,812 | Powell et al. | Jan. 12, 1957 |
| 2,807,580 | Fenning et al. | Sept. 24, 1957 |
| 2,823,179 | Snell et al. | Feb. 11, 1958 |

OTHER REFERENCES

TID-7001, U.S. Atomic Energy Commission, Materials Testing Reactor Project Handbook, edited by John H. Buck and Carl F. Leyse, May 7, 1951. Technical Information Service, Oak Ridge, Tenn. Pages 342, 406, 407.

TID-7513 (pt. 1), U.S. Atomic Energy Commission, Fourth Atomic Energy Commission Air Cleaning Conference, Held at Argonne National Laboratory, November 1955. June 1956 (TISE Issuance Date). Pages 58, 59.

TID-5275, Selected Reference Material, U.S. Atomic Energy Program Research Reactors. Library copy received Oct. 10, 1955. Pages 417, 418, 442.